United States Patent
Kitajima et al.

(10) Patent No.: US 11,644,736 B2
(45) Date of Patent: May 9, 2023

(54) VIBRATION TYPE ACTUATOR, CAMERA PLATFORM, AND ELECTRONIC DEVICE

(71) Applicant: CANON KABUSHIKI KAISHA, Tokyo (JP)

(72) Inventors: Satoru Kitajima, Tokyo (JP); Satoshi Tsuchiya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/390,577

(22) Filed: Jul. 30, 2021

(65) Prior Publication Data

US 2022/0043327 A1   Feb. 10, 2022

(30) Foreign Application Priority Data

Aug. 5, 2020   (JP) .............................. JP2020-133218

(51) Int. Cl.
  *G03B 17/56*   (2021.01)
  *H02N 2/10*   (2006.01)
  *H02N 2/16*   (2006.01)

(52) U.S. Cl.
  CPC .......... *G03B 17/561* (2013.01); *H02N 2/103* (2013.01); *H02N 2/163* (2013.01)

(58) Field of Classification Search
  CPC .......... G03B 17/561; G03B 2205/0061; H02N 2/103; H02N 2/0065; H02N 2/163
  See application file for complete search history.

(56) References Cited

U.S. PATENT DOCUMENTS

| | | | | |
|---|---|---|---|---|
| 2011/0273058 A1* | 11/2011 | Suefuji | ................ | H02N 2/0065 |
| | | | | 310/323.02 |
| 2020/0174347 A1* | 6/2020 | Tsuchiya | .................. | G03B 3/10 |
| 2020/0389101 A1* | 12/2020 | Suefuji | ..................... | B25J 9/12 |
| 2021/0242808 A1* | 8/2021 | Tsuchiya | .............. | H02N 2/0065 |
| 2022/0029558 A1* | 1/2022 | Tsuchiya | ................ | H02N 2/006 |

FOREIGN PATENT DOCUMENTS

| | | |
|---|---|---|
| JP | 5631018 B2 | 11/2014 |
| JP | 2017108615 A | 6/2017 |

* cited by examiner

*Primary Examiner* — Christopher E Mahoney
(74) *Attorney, Agent, or Firm* — Canon U.S.A., Inc. I.P. Division

(57) ABSTRACT

A vibration type actuator includes a vibration body, having an annular elastic body and an electro-mechanical energy conversion element, and includes a contact body having an annular shape. The contact body contacts the vibration body and relatively moves with regard to the vibration body. The contact body includes a base portion, a supporting portion that extends in an annular shape from the base portion in a radial direction of the contact body, and a friction member that is provided to the supporting portion, is a member different from the supporting portion, and is in contact with the vibration body. The friction member is connected to the supporting portion by a first surface extending along a central axis direction of the contact body and an annular second surface extending in the radial direction. The first surface includes a portion inclined with respect to the direction of the contact body central axis.

6 Claims, 6 Drawing Sheets

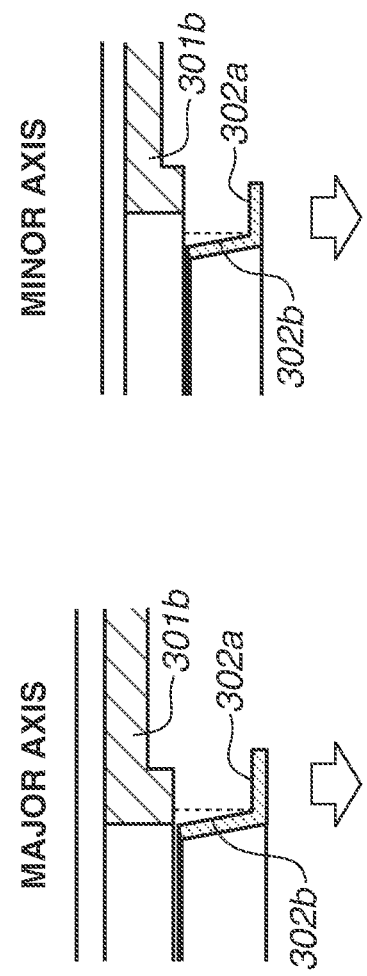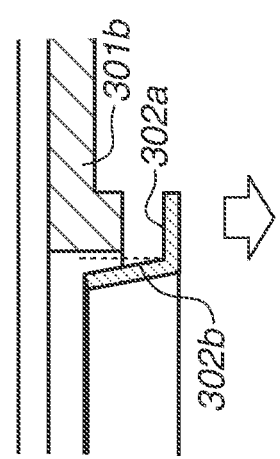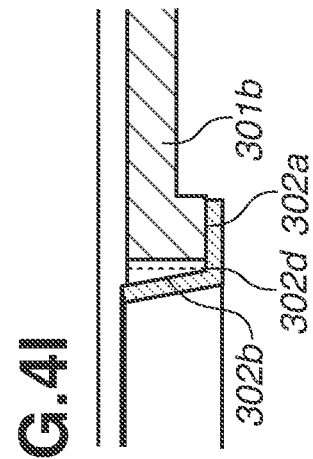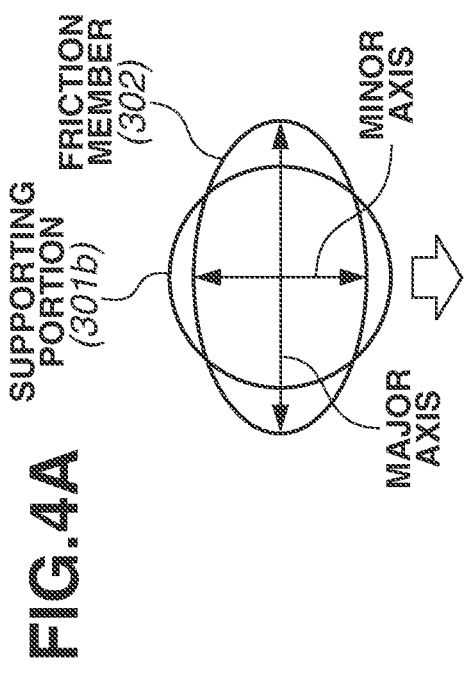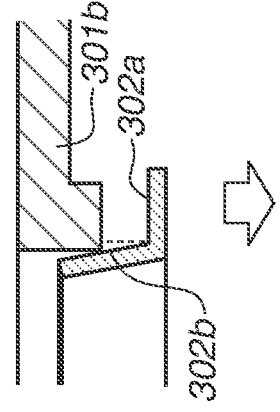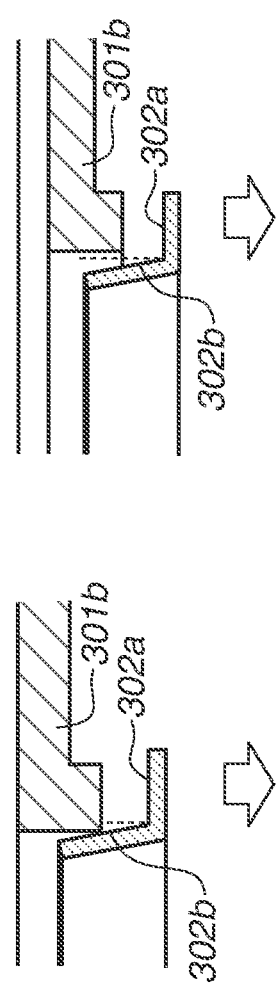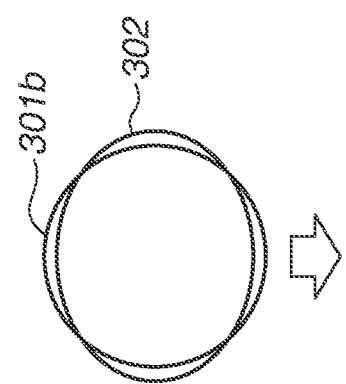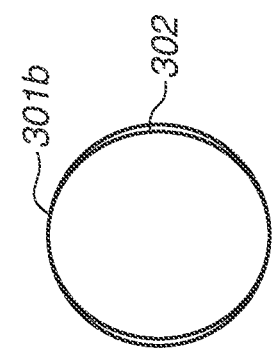

FIG.6
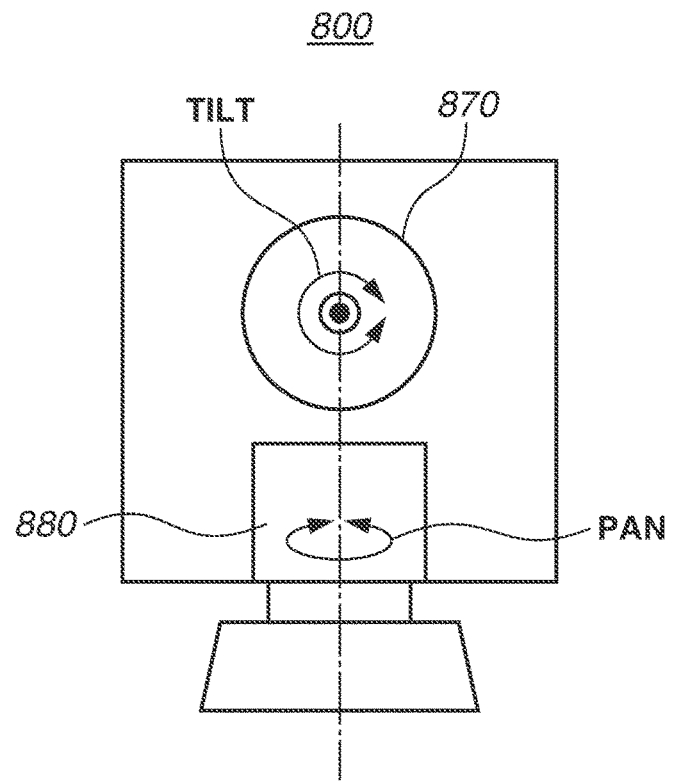
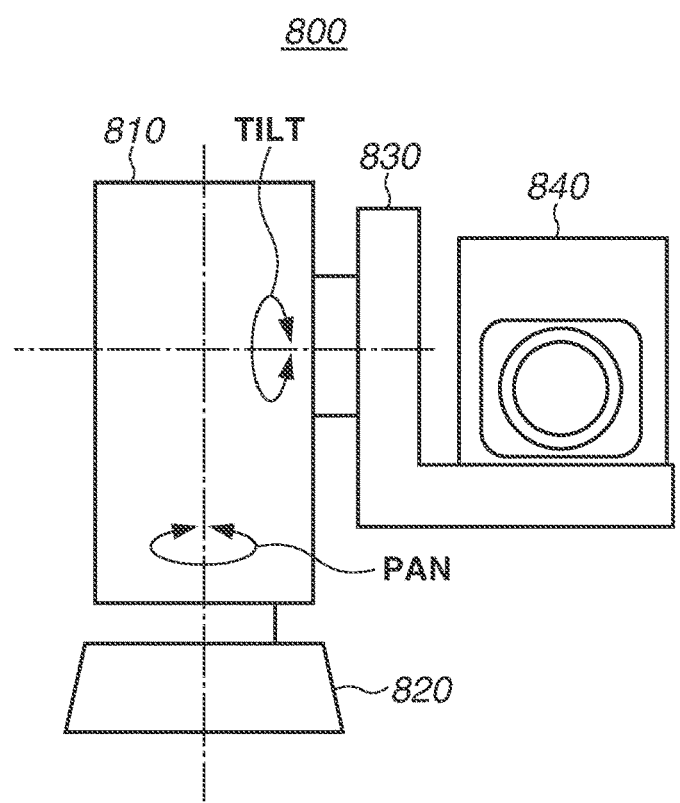

VIBRATION TYPE ACTUATOR, CAMERA PLATFORM, AND ELECTRONIC DEVICE

BACKGROUND

Field

The present disclosure relates to a vibration type actuator including a vibration body and a contact body.

Description of the Related Art

Vibration type actuators have features such as low speed and large torque and thus have been put to practical use as, for example, drive motors for autofocusing image capturing lenses in single lens reflex cameras. In recent years, the vibration type actuators are expected to be applied to various electronic devices other than cameras. For example, the vibration type actuator is expected to be applied to joint drive of a robot arm, rotary drive of a robot hand, rotary drive of a camera platform of an image capturing apparatus such as a monitoring camera, and rotary drive of a photosensitive drum of an image forming apparatus.

A technique for using press working of a plate material to manufacture a contact spring included in a moving member (a contacting body) is proposed in response to demands for productivity improvement and cost reduction of a vibration type actuator for application in the above described various uses (refer to Japanese Patent No. 5631018). In this technique, the contact spring is manufactured separately from a main body portion of the moving member, and then the contact spring and the main body portion are bonded to each other.

However, according to the technique discussed in Japanese Patent No. 5631018 (for example, FIG. 6 in Japanese Patent No. 5631018), the contact spring is distorted by press working and a heat treatment such as hardening, so that misalignment in adhesion or uneven thickness of an adhesive layer may occur at the time of adhesion of the moving member to the main body portion, and spring rigidity of the contact spring may become uneven. Accordingly, there is an issue that an abnormal noise (creak) is generated in the vibration type actuator in a lower sound pressure level standard for a quieter demand in recent years. Further, from a viewpoint of a high position controllability standard for rotary drive of a camera platform and a robot hand, post-processing is required to smooth a contact surface between a contact body and a vibration body in order to perform a smooth operation. Furthermore, from a viewpoint of a high durability standard, there is an issue that adhesive peeling occurs due to springback of the contact spring.

Further, according to the technique discussed based on FIGS. 7B and 7C in Japanese Patent No. 5631018, the contacting body (a friction member) is distorted by press working and a heat treatment such as hardening, and thus may cause deterioration in durability.

SUMMARY

The present disclosure is directed to the provision of a vibration type actuator that suppresses generation of an abnormal noise and deterioration in durability with high dimensional accuracy of parts and at low cost.

According to an aspect of the present disclosure, a vibration type actuator includes a vibration body configured to include an annular elastic body and an electro-mechanical energy conversion element, and a contact body having an annular shape, wherein the contact body is configured to be in contact with the vibration body and relatively move with regard to the vibration body, wherein the contact body includes: a base portion, a supporting portion that extends in an annular shape from the base portion in a radial direction of the contact body, and a friction member that is provided to the supporting portion, is a member different from the supporting portion, and is in contact with the vibration body, wherein the friction member is connected to the supporting portion by a first surface extending in a direction along a central axis of the contact body and an annular second surface extending in the radial direction, and wherein the first surface includes a portion inclined with respect to the direction of the central axis of the contact body.

Further features of the present disclosure will become apparent from the following description of exemplary embodiments with reference to the attached drawings.

BRIEF DESCRIPTION OF THE DRAWINGS

FIGS. 4A, 4B, 4C, 4D, 4E, 4F, 4G, 4H, and 4I illustrate alignment by aligning of a friction member in FIG. 1.

FIG. 6 schematically illustrates configurations of a camera platform mounting a vibration type actuator according to the exemplary embodiment of the present disclosure and an image capturing apparatus mounted on the camera platform.

DESCRIPTION OF THE EMBODIMENTS

Various exemplary embodiments of the present disclosure will be described in detail below with reference to the attached drawings.

Figure 1:
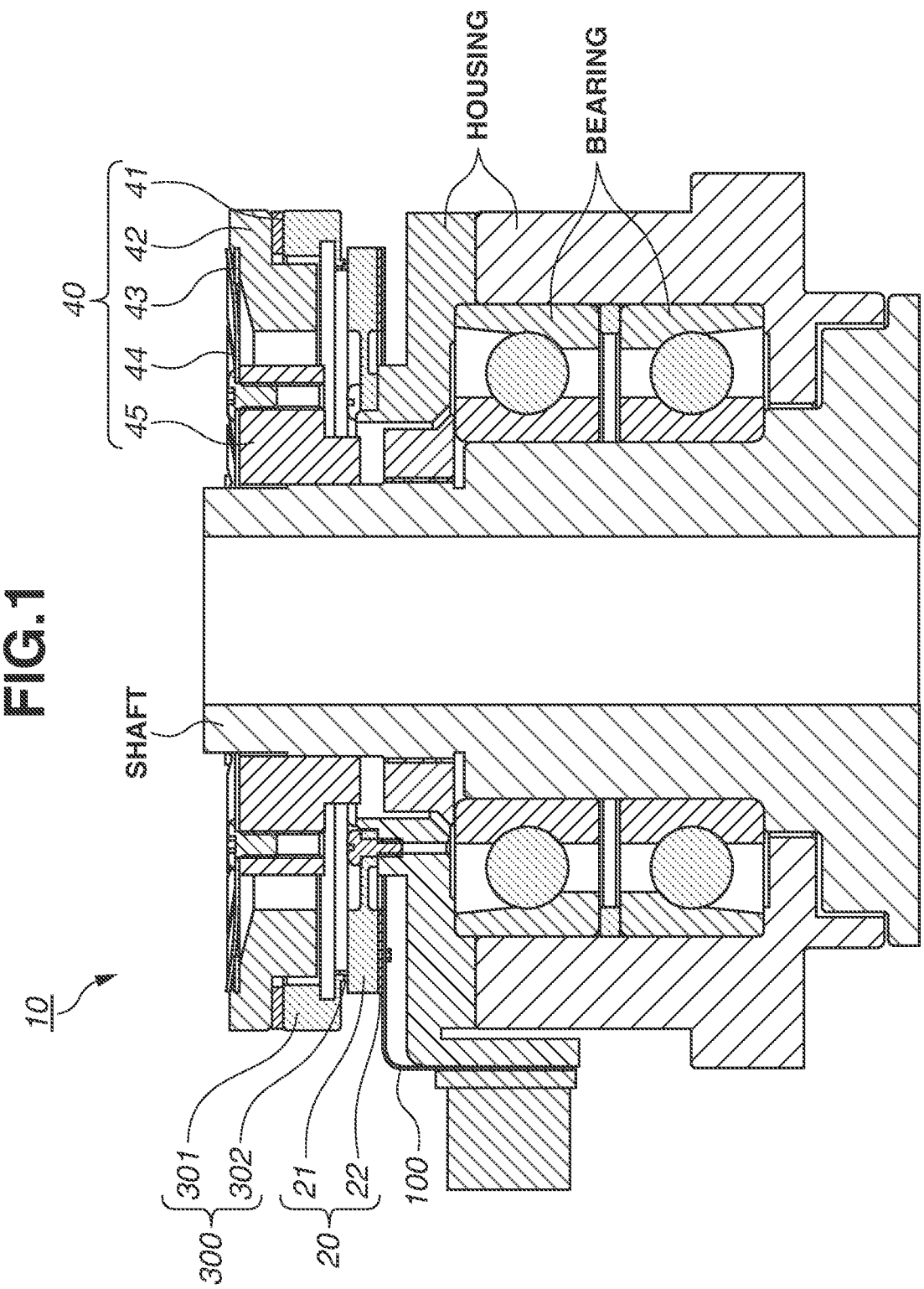
FIG. 1 is a cross-sectional view schematically illustrating a configuration of a vibration type actuator according to a first exemplary embodiment of the present disclosure.

FIG. 1 is a cross-sectional view schematically illustrating a configuration of a vibration type actuator 10 according to a first exemplary embodiment of the present disclosure. Mechanical configurations of a vibration body 20, a contact body 300 (a moving body and a driven body), a pressurizing mechanism 40, and the like in the vibration type actuator 10 are functionally equivalent to, for example, a vibration type actuator discussed in Japanese Patent Application Laid-Open No. 2017-108615.

The vibration type actuator 10 according to the present exemplary embodiment is provided with the vibration body 20 including an elastic body and an electro-mechanical energy conversion element and the contact body 300 in contact with the vibration body 20. In addition, the vibration type actuator 10 includes a power supply member (a flexible printed board) for supplying power to the electro-mechanical energy conversion element.

In FIG. 1, the vibration type actuator 10 includes the vibration body 20 formed in an annular shape, the contact body 300 formed in an annular shape, and the pressurizing mechanism 40. The vibration type actuator 10 further includes a shaft, a housing, and bearings.

The vibration body 20 includes an elastic body 21, a piezoelectric element 22, which is the electro-mechanical energy conversion element joined to the elastic body 21, and a power supply member 100, which is joined to the piezoelectric element 22 to apply an alternating-current (AC) driving voltage thereto.

The pressurizing mechanism 40 includes a damping rubber 41, a pressurizing spring receiving member 42, a pressurizing spring receiving rubber 43, a pressurizing spring 44, and a pressurizing spring fixing member 45. The vibration body 20 and the contact body 300 are arranged concentrically with the shaft as a central axis and are in pressure contact (friction contact) with each other in a thrust direction of the shaft by the pressurizing mechanism 40 fixed to the shaft. Specifically, the pressurizing spring 44 of which movement is restricted by the pressurizing spring fixing member 45 fixed to the shaft presses the contact body 300 in the thrust direction via the damping rubber 41, the pressurizing spring receiving member 42, and the pressurizing spring receiving rubber 43. With this configuration, the contact body 300 and the vibration body 20 are stably in contact with each other.

The vibration type actuator 10 applies an AC driving voltage to the piezoelectric element 22 via the power supply member 100 and thus excites a drive vibration in the vibration body 20. An aspect of the drive vibration depends on the number and arrangement of a plurality of electrodes included in the piezoelectric element 22, and the piezoelectric element 22 is designed so that the excited drive vibration becomes an n-th order (n=9 according to the present exemplary embodiment) traveling wave travelling in a circumferential direction of the vibration body 20. The n-th order drive vibration is a bending vibration in which a wave number of the vibration body 20 in the circumferential direction is "n". The drive vibration generated in the piezoelectric element 22 drives the contact body 300 in the circumferential direction around the shaft by the traveling wave generated in a contacting portion 25 of the vibration body 20. In other words, the contact body 300 relatively rotates while maintaining concentricity with the vibration body 20. A rotational force generated in the contact body 300 is output to the outside via the pressurizing mechanism 40 and the shaft.

The vibration type actuator 10 according to the present exemplary embodiment illustrated in FIG. 1 can freely rotate and drive a movable object such as a camera by, for example, fixing the housing to a desired member and fixing the movable object to a flange surface that is enlarged at a lower part of the shaft. Meanwhile, the vibration type actuator 10 can rotate and drive the housing by fixing the shaft.

Figure 2:
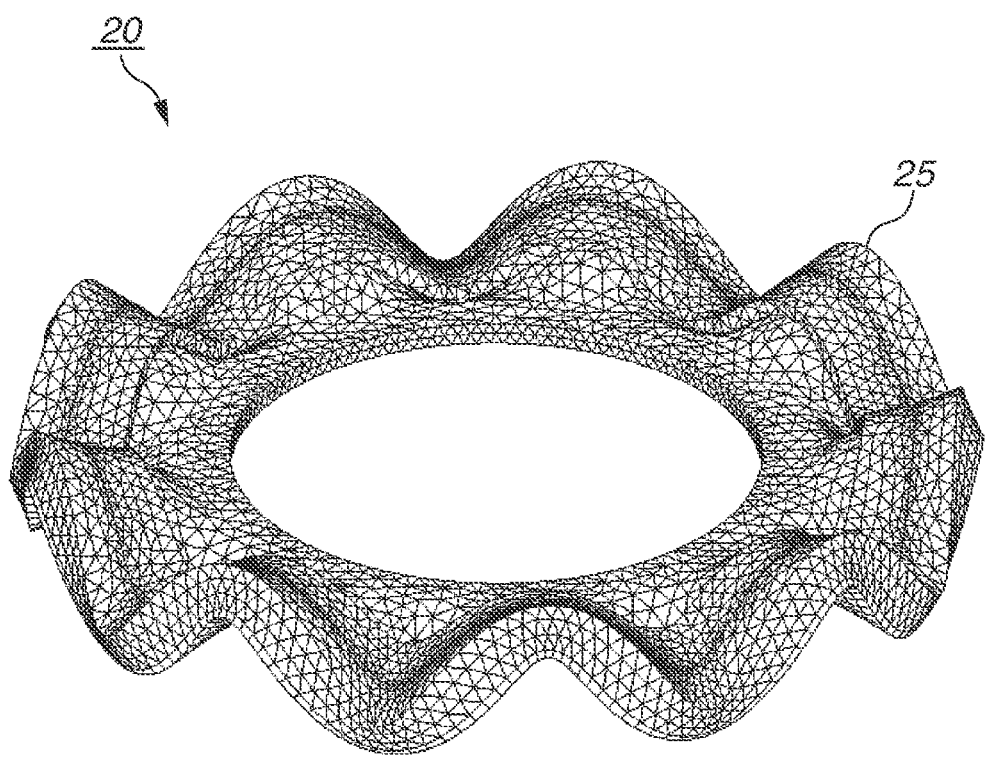
FIG. 2 illustrates an aspect of deformation in a drive vibration excited by a vibration body in FIG. 1.

FIG. 2 illustrates an aspect of deformation in the drive vibration excited by the vibration body 20. In FIG. 2, displacement is exaggerated more than it really is in order to facilitate understanding of the displacement of the drive vibration excited by the vibration body 20.

Figure 3A:
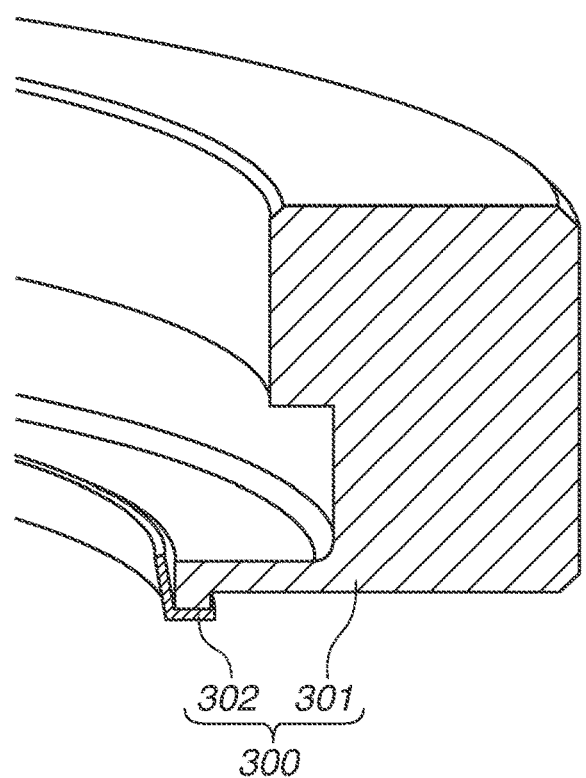
FIGS. 3A and 3B schematically illustrate a configuration of a contact body in FIG. 1.

FIG. 3A is a cross-sectional perspective view schematically illustrating a configuration of the contact body 300. The contact body 300 includes a main body member 301 and a friction member 302, which is a member different from the main body member 301. The main body member 301 and the friction member 302 are connected each other by adhesion or joining.

Figure 3B:
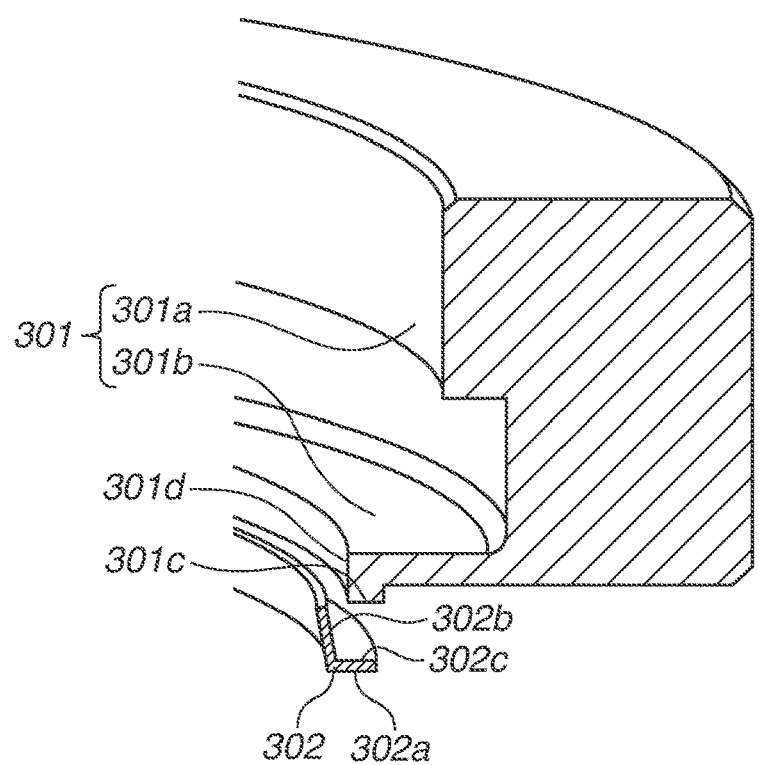

FIG. 3B is a cross-sectional perspective view schematically illustrating a state in which the main body member 301 and the friction member 302 are separated.

The main body member 301 includes a base portion 301a and a supporting portion 301b extending in a radial direction of the contact body 300. The supporting portion 301b has an L-shaped cross section, and the friction member 302 is connected to an end portion of the supporting portion 301b. The main body member 301 is formed in an annular shape.

The friction member 302 has an L-shaped cross section and is formed in an annular shape. The friction member 302 includes a first surface 302b extending in a direction along the central axis of the contact body 300 and is inclined in a central axis direction, a second surface 302c extending along a radial direction of the contact body 300, and a friction surface 302a being in contact with the vibration body 20. In other words, a radial gap between the first surface 302b and the supporting portion 301b becomes wider as the first surface 302b is distant from the surface in contact with the vibration body 20.

The first surface 302b is internally fitted (fitted to an inner diameter side of the supporting portion 301b) and connected to the supporting portion 301b. The second surface 302c is connected to the end portion of the supporting portion 301b. In a case where robustness can be sufficiently secured by connecting a part of the first surface 302b in a circumferential direction to the supporting portion 301b, the above-described configuration can be adopted. In addition, contact between the friction member 302 and the supporting portion 301b includes a case where the contact is made using fixation of an intermediate material such as an adhesive.

The contact body 300 is in contact with the vibration body 20 on the friction surface 302a, and the supporting portion 301b has a function of a contact spring. A variation in spring rigidity of the contact spring causes an abnormal noise (creak) of the vibration type actuator. Therefore, it is desirable that the supporting portion 301b as the contact spring is made of a material having a low Young's modulus such as an aluminum alloy and brass so as not to cause a variation in the spring rigidity even if there is a processing error. Meanwhile, it is desirable that the friction member 302 is made of a material having high abrasion resistance such as iron and steel since the friction member 302 comes in frictional contact with the vibration body 20. Generally, a material having high abrasion resistance such as iron and steel is harder and has a higher Young's modulus than a material such as an aluminum alloy and brass. In other words, it is desirable that a Young's modulus of a material forming the supporting portion 301b is lower than a Young's modulus of a material forming the friction member 302.

The base portion 301a is in contact with the damping rubber 41 and suppresses an abnormal noise of the vibration type actuator 10 by a damping effect.

Materials and processing methods of the main body member 301 and the friction member 302 are described. The friction member 302 is desirably made of a material having high abrasion resistance and can be manufactured by press working and hardening processing using a steel plate material such as stainless steel. Meanwhile, the main body member 301 is required to have a function of damping vibration, and it is desirable to use a free cutting material, which has high damping performance and can be processed with high accuracy, so that the main body member 301 can be manufactured by cutting work using an aluminum alloy and brass having a higher free cutting property than that of the friction member 302. The main body member 301 can be surface treated, and, for example, in a case of an aluminum alloy, it can be subjected to an alumite treatment. The manufacturing methods of the friction member 302 and the main body member 301 are not limited to the above-described ones. The processing method of the friction member 302 can include laser processing, electric discharge processing, cutting, etching, and a combination thereof. The heat treatment of the friction member 302 can be nitriding, carburizing, and the like, and a hardening treatment such as plating can be used in addition to the heat treatment. The processing method of the main body member 301 can include die casting, forging, and a combination thereof.

Assembly of the main body member 301 and the friction member 302 is described. The component of the main body member 301 has high rigidity and thus can be manufactured with higher accuracy than the friction member 302. In application of the vibration type actuator to a camera platform and a robot hand, which require particularly high positioning accuracy, high flatness of a contact surface between the contact body and the vibration body is required for a smooth operation. Since the component of the main body member 301 has the high rigidity, a surface 301c on a side, which is in contact with the vibration body 20, can have high flatness.

On the other hand, the friction member 302 is greatly distorted in a manufacturing process such as press working and hardening processing. However, the friction member 302 has low rigidity as a component and can be easily elastically deformed. Thus, the friction member 302 is elastically deformed and fitted with the high accurate main body member 301 as a basis. Accordingly, it is possible to suppress misalignment in adhesion of the friction member 302 and to improve circularity of the friction surface 302a in a state in which the friction surface 302a has high flatness.

FIGS. 4A to 4C are schematic drawings illustrating fitting (insertion) in the assembly of the supporting portion 301b and the friction member 302. In each of FIGS. 4A to 4C, the supporting portion 301b, which has been accurately processed, is illustrated in a perfect circle shape, and the friction member 302, which is greatly distorted, is illustrated in an elliptical shape. FIGS. 4D to 4F each illustrate a cross section of the supporting portion 301b and the friction member 302 at a major axis position in the elliptical shape of the friction member 302. FIGS. 4G to 4I each illustrate a cross section of the supporting portion 301b and the friction member 302 at a minor axis position in the elliptical shape of the friction member 302. Further, FIGS. 4A, 4D, and 4G each illustrate a state before insertion of the supporting portion 301b and the friction member 302, and FIGS. 4B, 4E, and 4H each illustrate a state in the middle of the insertion. FIGS. 4C, 4F, and 4I each illustrate a state in which the surface 301c on the side, which is in contact with the vibration body 20, of the supporting portion 301b abuts on the second surface 302c in a direction along the central axis of the contact body 300.

The first surface 302b is inclined with respect to the central axis direction of the contact body 300 as being distant from the second surface 302c in the central axis direction of the contact body 300. As the friction member 302, which is greatly distorted, is inserted into the supporting portion 301b, which has been highly accurately processed, the friction member 302 is corrected from the elliptical shape to the perfect circle shape following the inclination of the first surface 302b. Accordingly, the circularity of the friction surface 302a is improved. An inner diameter 301d of the supporting portion 301b is greater than an outermost diameter 302d of the first surface 302b. Thus, the supporting portion 301b abuts on the second surface 302c before the first surface 302b and the inner diameter 301d of the supporting portion 301b come into contact with each other over an entire circumference. Accordingly, the second surface 302c follows the supporting portion 301b, which has been highly accurately processed, over the entire circumference, and the flatness of the friction surface 302a is improved.

In order for the vibration type actuator 10 to operate smoothly, the contact surface between the contact body 300 and the vibration body 20 is required to be smooth. The flatness of the friction surface 302a is improved in the assembly of the contact body 300, and thus it is possible to reduce or eliminate a processing time for smoothing the friction surface after the assembly.

The inclination of the first surface 302b according to the present exemplary embodiment is 10 degrees with respect to the central axis of the contact body 300. However, the inclination is not limited to this value as long as the friction member 302 is corrected to a perfect circle shape as being inserted into the supporting portion 301b, and the inclination is desirably more than 0 degrees and 45 degrees or less.

In addition, it is desirable that the main body member 301 and the friction member 302 are connected by adhesion or joining to avoid friction between metals. Accordingly, an abnormal noise (creak) in the vibration type actuator 10 can be suppressed.

Figure 5:
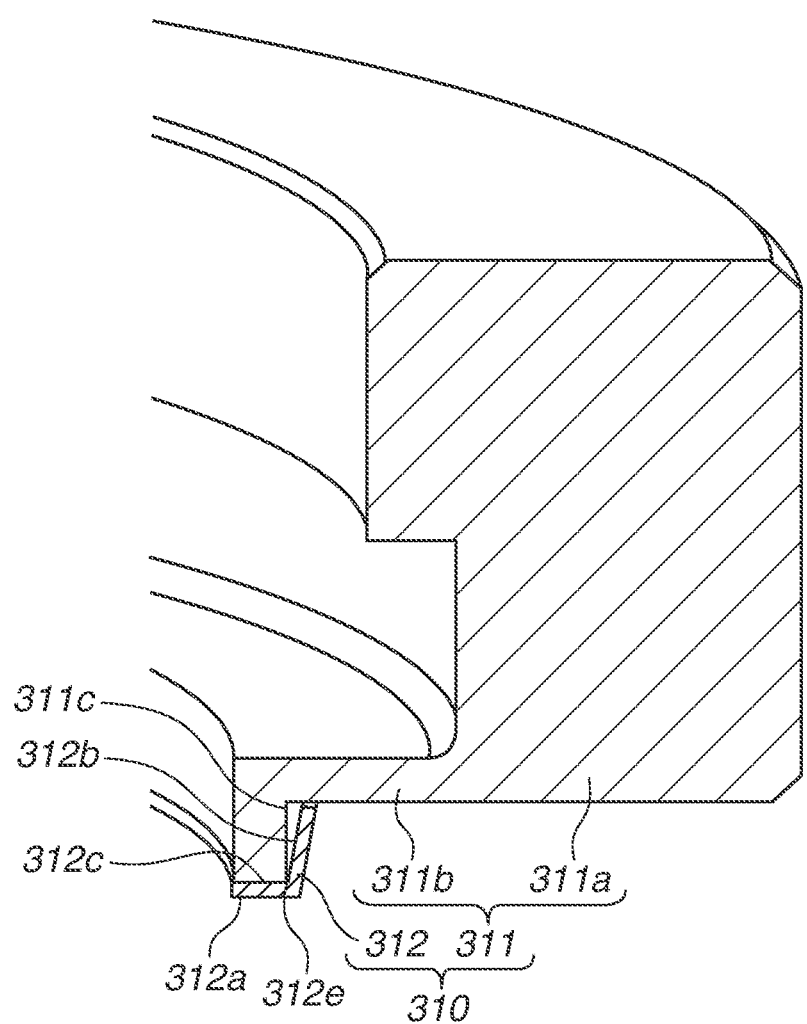
FIG. 5 schematically illustrates a configuration of a contact body in FIG. 1 according to a first modification.

FIG. 5 illustrates an example of a modification of the present exemplary embodiment. A contact body 310 includes a main body member 311 and a friction member 312, which is a member different from the main body member 311. The main body member 311 is formed in an annular shape and includes a base portion 311a and a supporting portion 311b, which extends in a radial direction of the contact body 310 and has an L-shaped cross-sectional shape at its end portion. The friction member 312 has an L-shaped cross-sectional shape and includes a friction surface 312a, which is in contact with the vibration body 20, and a first surface 312b including a portion, which extends in a direction along a central axis of the contact body 310 and is inclined in a central axis direction. The friction member 312 further includes a second surface 312c, which extends in the radial direction of the contact body 310 and is formed in an annular shape as a whole. The first surface 312b is externally fitted (fitted to an outer diameter of the supporting portion 311b) and connected to an L-shaped portion of the supporting portion 311b. The second surface 312c is connected to the supporting portion 311b in a direction of abutting a direction along the central axis of the contact body 310. The outer diameter of the supporting portion 311b is less than an innermost diameter 312e of the first surface 312b. A configuration of the present modification can obtain a similar effect as that of the present exemplary embodiment.

According to the present exemplary embodiment, the configuration in which a cross-sectional shape of the supporting portion of the contact body is a cantilever, and the friction member is provided by being fitted to an end portion of the cantilever is described, but the present disclosure is not limited to this configuration. The supporting portion can be provided with the friction member being fitted to a place other than the end portion. Further, a configuration in which the cross-sectional shape of the supporting portion is a both ends supported beam, and the friction member is provided by being fitted to a center of the beam can be adopted. The above-described configurations can obtain a similar effect as that of the present exemplary embodiment.

According to the present exemplary embodiment, the configuration in which the friction member has a closed annular shape over a whole circumference is described, but the present disclosure is not limited to this configuration. The friction member can be partially open or have an approximately annular shape. The above-described configurations can obtain a similar effect as that of the present exemplary embodiment. In the drawings of the present exemplary embodiment, the configuration is illustrated in which a processing error and a distortion in the manufacturing process are not considered, but the present disclosure is not limited to this configuration. In the contact body actually manufactured, corner portions may have a larger radius (R) than that in the drawings, sagging and a burr may occur, and a gap between the main body member and the friction member may be uneven. Even the above-described configurations can obtain a similar effect as that of the present exemplary embodiment.

According to a second exemplary embodiment, a configuration of a camera platform of an image capturing apparatus such as a monitoring camera is described as an example of a device provided with the vibration type actuator 10, which has been described according to the first exemplary embodiment.

According to the present exemplary embodiment, the camera platform including a turntable and a vibration type actuator provided to the turntable is described below.

FIG. 6 schematically illustrates a configuration of a camera platform 800 and an image capturing apparatus 840 mounted on the camera platform 800. The camera platform 800 includes a base 820, a head 810 provided with two vibration type actuators 870 and 880, and an L-shaped angle 830 for fixing the image capturing apparatus 840. The vibration type actuator 880 provided to a pan axis is an actuator for rotating the head 810, the L-shaped angle 830, and the image capturing apparatus 840 around the pan axis with respect to the base 820. The vibration type actuator 870 provided to a tilt axis is an actuator for rotating the L-shaped angle 830 and the image capturing apparatus 840 around the tilt axis with respect to the head 810.

These two vibration type actuators 870 and 880 are used for the camera platform 800, and thus an orientation of the image capturing apparatus 840 can be changed at high speed, with high response, quietly, and with high accuracy. Further, since the vibration type actuator 870 has high holding torque even when power is not supplied, the orientation of the image capturing apparatus 840 can be maintained without consuming power of the vibration type actuator 870 even if the center of gravity of the image capturing apparatus 840 is shifted around the tilt axis.

In addition, an electronic device can be provided, which is desired by a user of the present disclosure and includes a member and a vibration type actuator provided to the member.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-133218, filed Aug. 5, 2020, which is hereby incorporated by reference herein in its entirety.

What is claimed is:

1. A vibration type actuator comprising:
   a vibration body configured to include an annular elastic body and an electro-mechanical energy conversion element; and
   a contact body having an annular shape, wherein the contact body is configured to be in contact with the vibration body and relatively move with regard to the vibration body,
   wherein the contact body includes:
   a base portion,
   a supporting portion that extends in an annular shape from the base portion in a radial direction of the contact body, and
   a friction member that is provided to the supporting portion, is a member different from the supporting portion, and is in contact with the vibration body,
   wherein the friction member is connected to the supporting portion by a first surface, of the friction member, extending in a direction along a central axis of the contact body, and an annular second surface, of the friction member, extending in the radial direction,
   wherein the first surface includes a portion inclined with respect to the direction along the central axis of the contact body, and
   wherein, as the inclined portion of the first surface is distant from a surface, of the friction member, being in contact with the vibration body, a gap in the radial direction between the inclined portion and the supporting portion becomes wider.

2. The vibration type actuator according to claim 1, wherein an inclination of the first surface with respect to the central axis of the contact body is more than 0 degrees and less than or equal to 45 degrees.

3. The vibration type actuator according to claim 1, wherein a part of the first surface in a circumferential direction is connected to the supporting portion.

4. The vibration type actuator according to claim 1, wherein the supporting portion and the friction member are fixed to each other by an adhesive.

5. A camera platform comprising:
   a turntable; and
   the vibration type actuator according to claim 1 that is provided to the turntable.

6. An electronic device comprising:
   a member; and
   the vibration type actuator according to claim 1 that is provided to the member of the electronic device.

* * * * *